(12) United States Patent
Greenebaum et al.

(10) Patent No.: US 9,036,908 B2
(45) Date of Patent: May 19, 2015

(54) BACKWARDS COMPATIBLE EXTENDED IMAGE FORMAT

(71) Applicant: Apple Inc., Cupertino, CA (US)

(72) Inventors: Kenneth Greenebaum, San Carlos, CA (US); Ian Hendry, San Jose, CA (US); Ian Ollmann, Los Gatos, CA (US); David Hayward, Los Altos, CA (US); Brijesh Tripathi, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 14/042,447

(22) Filed: Sep. 30, 2013

(65) Prior Publication Data

US 2015/0093023 A1    Apr. 2, 2015

(51) Int. Cl.
*G06T 9/00*      (2006.01)
*H04N 19/85*   (2014.01)
*H04N 19/463* (2014.01)

(52) U.S. Cl.
CPC ............ *G06T 9/00* (2013.01); *H04N 19/00903* (2013.01); *H04N 19/00551* (2013.01)

(58) Field of Classification Search
USPC ................. 382/166, 232, 233, 239, 299, 305; 348/443, 606, 607, 622, E5.111; 370/450, E7.093; 707/E17.116; 709/219, 227; 712/208
See application file for complete search history.

(56) References Cited

U.S. PATENT DOCUMENTS 5,117,289 A *  5/1992  Farley et al. .................. 348/443
5,603,012 A *  2/1997  Sotheran ....................... 712/208
7,114,660 B1  10/2006  Cok
8,520,978 B2 *  8/2013  Jakobovits .................... 382/299
2012/0213407 A1  8/2012  Haikin
2013/0077880 A1  3/2013  Venkataraman

FOREIGN PATENT DOCUMENTS

EP       2375383 A2    10/2011
WO     2012036947      3/2012

OTHER PUBLICATIONS

Ishtiaq Rasool Khan et al: "A New Encoding Scheme for HDR Images," Signal Processing and Communications, 2007, ICSPC 2007, IEEE International Conference on, IEEE, Piscataway, NJ, USA, Nov. 24, 2007, pages.

Kevin E. Spaulding et al: "Extending the color gamut and dynamic range of an sRGB image using a residual image," Color Research & Application, vol. 28, No. 4, Jun. 12, 2003, pp. 251-266, XP055007874, US, ISSN: 0361-2317, DOI: 10.1002/col. 10160.

(Continued)

*Primary Examiner* — Anh Do
(74) *Attorney, Agent, or Firm* — Wong, Cabello, Lutsch, Rutherford & Brucculeri, LLP

(57) ABSTRACT

Techniques are provided for encoding an extended image such that it is backwards compatible with existing decoding devices. An extended image format is defined such that the extended image format is consistent with an existing image format over the full range of the existing image format. Because the extended image format is consistent with the existing image format over the full range of the existing image format, additional image information that is included in an extended image can be extracted from the extended image. A base version of an image (expressed using the existing image format) may be encoded in a payload portion and the extracted additional information may be stored in a metadata portion of a widely supported image file format.

20 Claims, 8 Drawing Sheets

(56) References Cited

OTHER PUBLICATIONS

Min Chen et al: "JPEG Compatible Coding of High Dynamic Range Imagery using Tone Mapping and Vector Quantization," 25, Picture Coding Symposium; Apr. 24, 2006-Apr. 26, 2006, Beijing, Apr. 24, 2006, XP030080209.

Wu Y et al: "Bit-depth scalability compatible to H.264/AVC-scalable extension," Journal of Visual Communicatin and Image Representation, Academic Press, Inc. US, vol. 19, No. 6, Aug. 1, 2008, pp. 372-381, XP025611597, ISSN: 1047-3203, DOI: 10.116/J.JVCIR. 2008.06.003 [retrieved on Jun. 19, 2008].

Ward, et al., "JPEG-HDR: A Backwards-Compatible, High Dynamic Range Extension to JPEG." Data Compression Conference (DCC),Mar. 20-22, 2013, ISSN: 1068-0314, Print ISBN: 978-1-4673-6037-1, DOI: 10.1109/DCC.2013.24, pp. 153-160.

* cited by examiner

BACKWARDS COMPATIBLE EXTENDED IMAGE FORMAT

BACKGROUND

This disclosure relates generally to an image encoding system and method that provides increased precision, increased dynamic range, and a wider color gamut as compared to many existing image file formats. More particularly, this disclosure relates to an image encoding method that is backwards compatible with existing devices such that the increased precision, dynamic range, and color gamut data does not cause existing devices to fail.

As is known, digital images are expressed in terms of reference values that define the properties of the image. For example, properties for each pixel of a digital image may be specified by multiple reference values (e.g., R or red, G or green, and B or blue values). These reference values are defined in terms of a color model. A color model describes the way that colors can be represented using combinations of reference values. The set of colors that can be produced according to a particular color model is a color space. The most common color model for producing images on display devices such as television screens, computer monitors, tablets, etc. is the RGB color model. The RGB color model defines a set of colors that are produced from combinations of varying levels (i.e., varying reference values) of red, green, and blue primary colors.

The CIE 1931 color space chromaticity diagram is illustrated in FIG. 1. Outer curved boundary 105 represents the visible spectrum monochromatic colors with wavelengths indicated in nanometers. The colors along outer curved boundary 105 progress through a range of purple, blue, green, yellow, orange, and red with increasing wavelength. The chromaticities of the red, green, and blue color primaries for a particular RGB color space (i.e., the chromaticity where one color channel has a nonzero value and the other two channels have zero values) form the vertices of color triangle 115. The gamut of chromaticities that can be represented by the RGB color space are represented by the chromaticities that are within color triangle 115. Color triangle 115 corresponds to the sRGB color space, the most common of the RGB color spaces. Vertex 110A is the sRGB red primary, vertex 110B is the sRGB green primary, and vertex 110C is the sRGB blue primary. The D65 white point, the point at which all of the color channels are equal to one, is illustrated at 120.

As indicated in FIG. 1, typical color spaces such as the sRGB color space encompass substantially less than the full range of chromaticities that are visible to humans. In addition, typical color spaces are capable of representing only a small portion of the brightness levels that can be perceived by humans. These color space limitations have been incorporated into commonly used color spaces by design based on the colors that display media are capable of producing. That is, color spaces need only encompass the colors that can be produced by existing display media such as television displays and computer monitors. In fact, the precision with which colors can be produced (for a given data size) is increased where the color space is limited to only those colors that can be produced. With the advent of new display technologies that are capable of producing a wider color gamut (i.e., a wider range of chromaticities) and increased dynamic range (i.e., a wider range of brightness levels), it will be necessary to define images in terms of color spaces that include a wider range of colors. However, during this transition, it will also be necessary that image files carrying the additional color information can also be read and rendered by existing devices. It would therefore be desirable to specify a method and system for encoding images that provides increased precision, increased dynamic range, and a wider color gamut as compared to existing image file formats and that is also compatible with existing display devices.

SUMMARY

A method of encoding an image having extended image content may include obtaining a first image expressed in a first image format and obtaining a second image that corresponds to the first image and is expressed in a second image format. Each element of the first image may be defined by reference values in a first range and each element of the second image may be defined by reference values in a second range. The first range may be a proper subset of the second range such that the first format and the second format are consistent over the complete range of reference values for the first format. In one embodiment, the first image may then be subtracted from the second image to obtain a delta image. The first image may be encoded in the standard payload portion of an image file and the delta image may be encoded in a metadata portion of the image file. The method may be embodied in program code and stored on a non-transitory medium. The stored program code may be executed by one or more processors that are part of, or control, a system that is configured to implement the method.

A method of decoding an image having extended image content may include decoding a payload portion of the image file to generate a first image. The first image may be expressed in a base image format where each image element is defined by reference values in a first range. A metadata portion of the image file may be decoded to generate additional image data. The additional image data may be combined with the first image to generate a second image. The second image may be expressed using an extended image format where each image element is defined by reference values in a second range. The first range may be a proper subset of the second range such that the base image format and the extended image format are consistent over the complete range of reference values for the base image format. The method may be embodied in program code and stored on a non-transitory medium. The stored program code may be executed by one or more processors that are part of, or control, a system that is configured to implement the method.

DETAILED DESCRIPTION

This disclosure pertains to systems, methods, and computer readable media for encoding an extended image such that it is backwards compatible with existing decoding devices. In general, an extended image format is defined that uses channel primaries that match an existing image format. Because the extended image format references the channel primaries of an existing image format, additional image information that is included in the extended image format can be extracted through computationally inexpensive operations as described below.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of image processing having the benefit of this disclosure.

Figure 1:
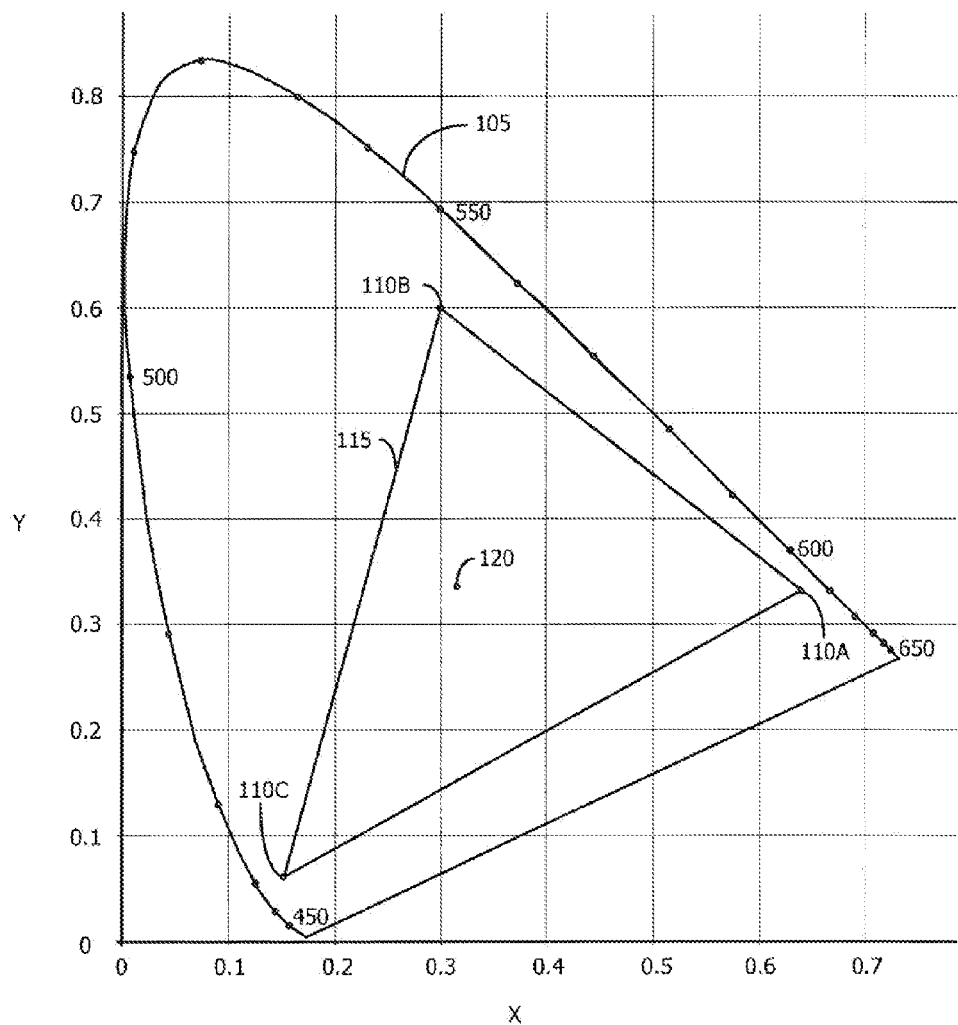
FIG. 1 illustrates the CIE 1931 color space chromaticity diagram with the sRGB color gamut specified.
Figure 2:
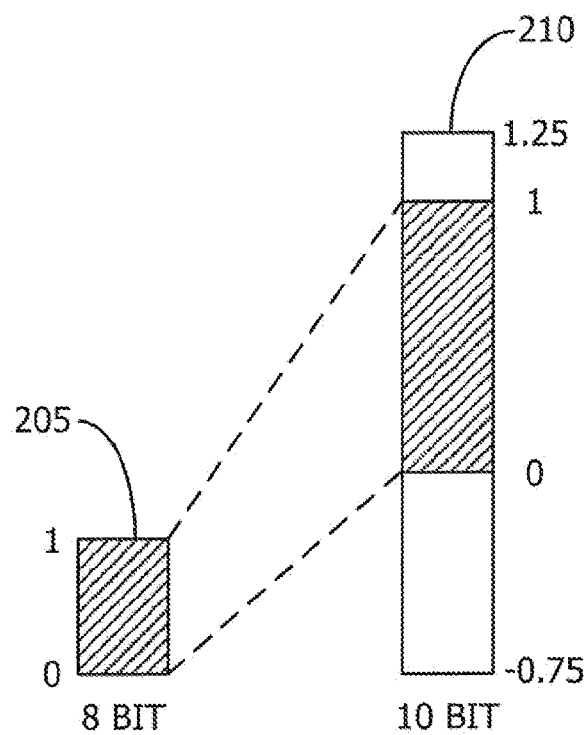
FIG. 2 is a block diagram that illustrates the components of an extended image format in accordance with one embodiment.

Referring to FIG. 2, a base image format may describe an image in terms of reference values 205 that define the properties of image pixels. For example, each pixel of an image expressed in an RGB format may include reference values for a red channel, a green channel, and a blue channel. Collectively, the reference values for the red, green, and blue channels define the properties of the pixel within a given color space (i.e., a color space defined by the red, green, and blue channel primaries). The reference values may be described in terms of nominal values that range from 0.0 to 1.0. For example, an image pixel having a value of (1.0,0.0,0.0) (expressed as (R, G, B)), would be a pure red pixel with the highest possible brightness (i.e., a pixel having the properties of the red channel primary). In the illustrated embodiment, as is common for popular consumer image formats, each reference value can be expressed as an 8 bit binary number. One of ordinary skill in the art will recognize that other bit depths are possible. For example, 16 bit.

In one embodiment, an extended image format is consistent with the base image format over the range of reference values of the base image format. Therefore, the extended image format references the same primaries as the base image format (e.g., Red, Green, and Blue). However, the nominal range for reference values 210 may be extended to encode additional image data (i.e., image data that cannot be represented using the base format such as, for example, gamut, dynamic range, and precision). That is, the range of reference values of the base image format is a proper subset of the range of reference values of the extended image format. Because the extended image format is consistent with the base image format over the range of reference values for the base image format, reference values within this range (i.e., nominal values of 0.0 to 1.0 in the illustrated embodiment) represent the same color properties in either the base image format or the extended image format. In the illustrated embodiment, the nominal range for each reference value 210 in the extended image format is doubled as compared to the base image format reference value 205 (from 0.0-1.0 to −0.75-1.25). This extended nominal range may be utilized to encode increased brightness and a wider color gamut than can be produced using the base image format. In one embodiment, negative values may be utilized to encode colors that are outside of the base image format gamut (i.e., outside of the color space of the base image format). For example, a value of (1.0, −0.75, −0.75) may represent a very saturated red that cannot be represented in the base image format. Over unity values may be utilized to encode increased brightness that cannot be represented using the base image format (i.e., outside of the dynamic range of the base image format). For example, (1.25, 0.0, 0.0) may represent a much brighter version of the red primary. In addition, in the illustrated embodiment, reference values for the extended image format are expressed using 10 bit binary numbers. Accordingly, in this embodiment, one additional bit may be utilized to double the nominal range as compared to the base image format and another additional bit to double the precision throughout the increased nominal range. One advantage of this approach is that when combined with non-linear gamma, the effective linear range of the representation is increased. By way of example, a 2.2 gamma value in a 0.0 to 1.0 representation is still 0.0 to 1.0 linear. In contrast, a 2.2 gamma value in a 0.0 to 1.25 representation is actually 1.6 times the range provided by the 0.0 to 1.0 linear range.

It should be noted that the illustrated embodiment is provided as an example only. It is not necessary that the additional image information of the extended format be distributed in the manner illustrated in FIG. 2 (i.e., 75% of the additional range devoted to wider gamut and 25% devoted to increased dynamic range), that the reference values for the base and extended formats be encoded using any particular number of bits, or that the reference values correspond to an RGB color model. This disclosure is equally applicable to any extended image format (using any color model) that extends the range of reference values to encode image information that cannot be encoded using a base image format while maintaining consistency over the range of reference values of the base image format.

Figure 3:
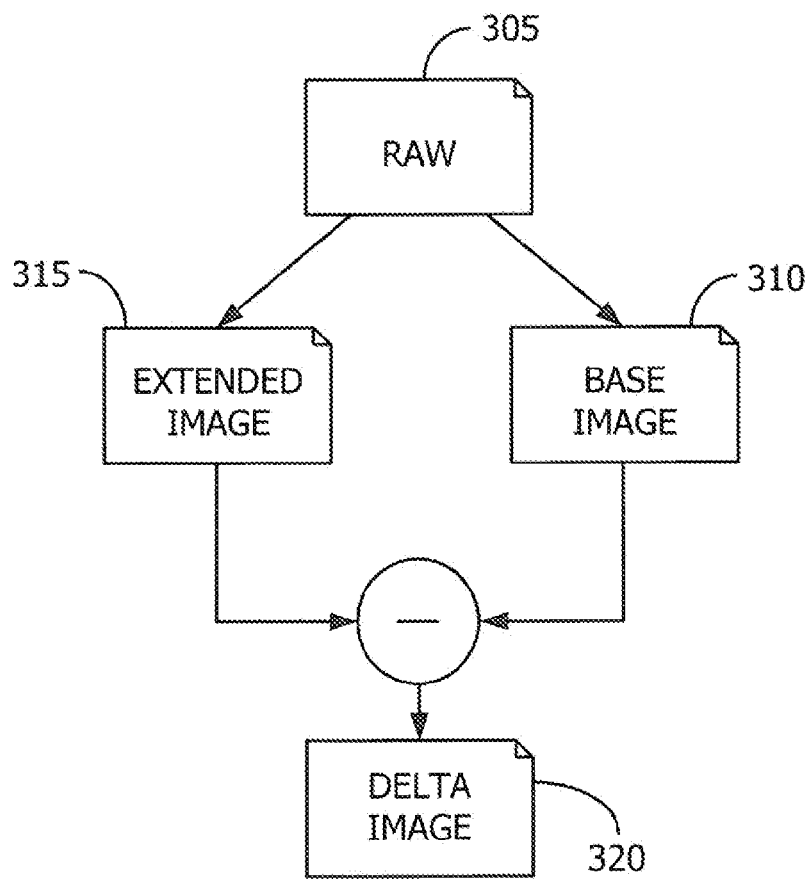
FIG. 3 is a block diagram that illustrates an operation to extract the additional information encoded in an extended image format in accordance with one embodiment.

Referring to FIG. 3, in one embodiment and as will be described in further detail below, it may be desirable to identify the differences between an image expressed using the base image format and a corresponding image expressed using the extended image format. Raw image 305 may include image sensor data that has either not been processed at all or has only been minimally processed. Raw image 305 may be analogous to a film photography negative in that each may include image information that is not included in a final image format. For example, some of the information captured by an image sensor and included in raw image 305 may represent brightness levels or colors that cannot be encoded in base image 310 or even extended image 315. As will be understood by those of ordinary skill in the art, the conversion of raw image 305 to extended image 315 and base image 310 may involve operations that include noise reduction, sharpening, demosaicing, black subtraction, highlight recovery, tone mapping etc., all of which are outside of the scope of the present disclosure. The result of these processes, however, will produce base image 310 that is comprised of reference values for a base image format such as reference values 205 and an extended image that is comprised of reference values for an extended image format such as reference values 210. Extended image 315 may include image information from raw image 305 that cannot be expressed in base image 310.

In addition, although the extended image format is consistent with the base image format over the range of reference values for the base image format, the conversion process between raw image 305 and base and extended images 310 and 315 may result in different reference values even for colors that can be expressed within the base image format range. For example, if raw image 305 depicts a bright yellow object that cannot be entirely reproduced within the base image format of base image 310, rather than clamping the colors that extend outside of the base image color space at the maximum reference values, which results in a flat and unnatural appearance, the conversion process may adjust certain colors that are within the base image color space such that a more natural reproduction of the object is obtained. However, when converting raw image 305 to extended image 315, which is capable of representing a broader color space, it may not be necessary to adjust the object's colors in the same way as for the base image format. While FIG. 3 illustrates the conversion of raw image 305 to both base image 310 and extended image 315, in another embodiment, raw image 305 may be converted to extended image 315 and base image 310 may be generated from extended image 315. After each of base image 310 and extended image 315 have been generated, base image 310 may be subtracted from extended image 315 to extract the difference between the two images, expressed as delta image 320.

Figure 4:
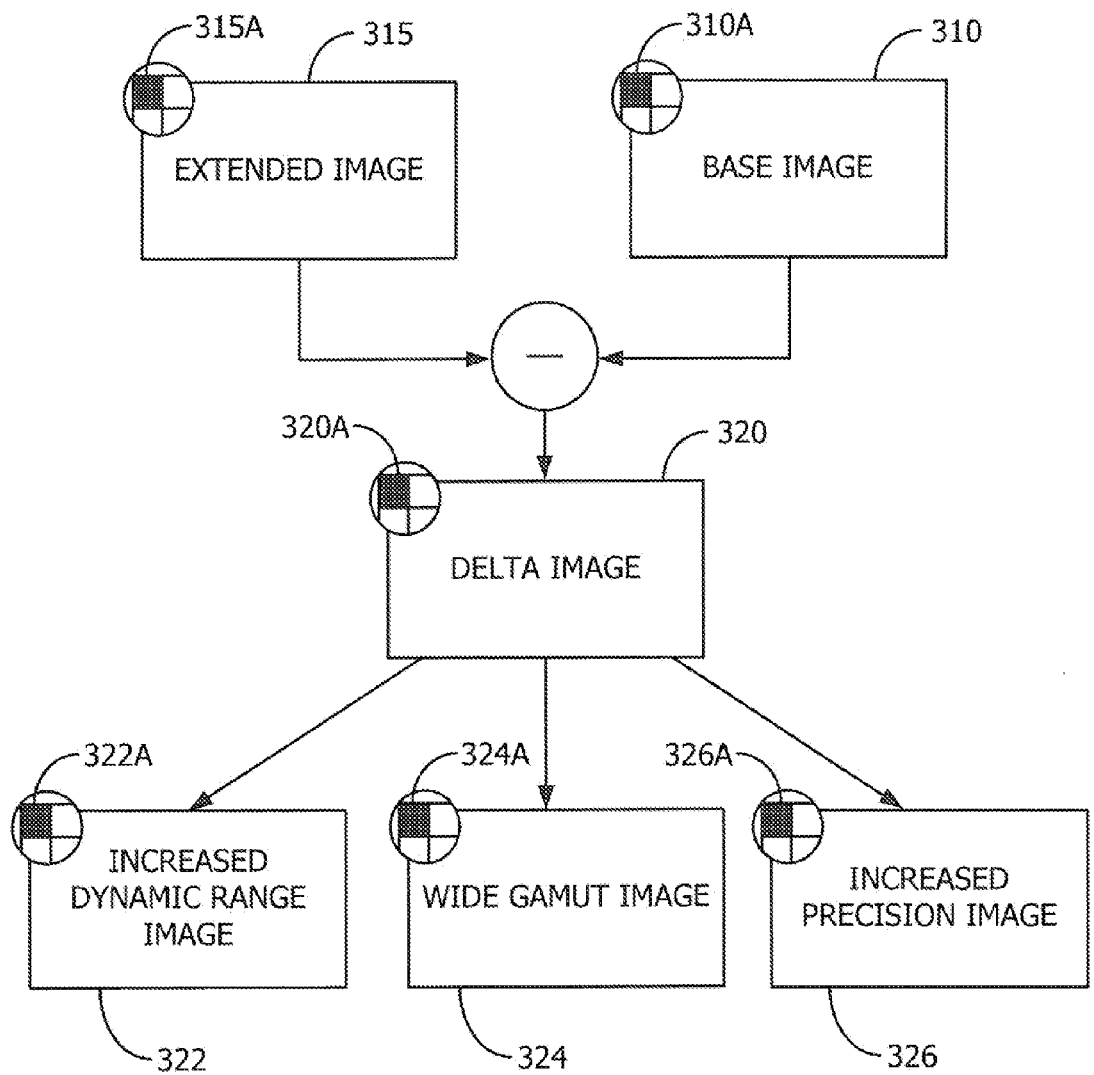
FIG. 4 is a block diagram that illustrates an operation to extract the additional information encoded in an extended image format and to separate the extracted information into different channels in accordance with one embodiment.

Referring to FIG. 4, because extended image 315 is expressed in terms of an extended format that is consistent with the base image format of base image 310 over the full range of reference values for base image 310, the extraction of delta image 320, which carries all of the additional information contained in extended image 315 and not in base image 310, may be performed as a simple pixel by pixel difference operation. For example, reference values for pixel 310A of base image 310 may be subtracted from corresponding reference values for corresponding pixel 315A of extended image 315. The resulting reference values define the properties of pixel 320A of delta image 320. Using the extended format described above with respect to FIG. 2 as an example, the nominal reference values of pixel 315A may be (1.21, −0.4, −0.3), which specifies a bright, deep red color that is outside of the range of the base image format of base image 310. The reference values of corresponding pixel 310A may be (0.98, 0, 0), which represents nearly the brightest, deepest red that can be produced using the base image format. The numeric representations of the 10 bit binary expression of the reference values of pixel 315A and the 8 bit binary expression of the reference values of pixel 310A are (1003, 179, 230) and (250, 0, 0), respectively. This results in reference values of (753, 179, 230) for pixel 320A of delta image 320.

In one embodiment, it may be desirable to separate the delta image into multiple delta image channels, each representing a particular feature. For example, in the illustrated embodiment, delta image 320 may be separated into delta image channels 322, 324, and 326, which represent additional dynamic range, wider color gamut, and increased precision of extended image 315 with respect to image 310, respectively. The number and types of delta image channels generally depends on the differences between the extended image format and the base image format. In order to separate the portions of delta image 320 that are attributable to these various characteristics, the reference values for each pixel of delta image 320 may be compared to the reference values for corresponding pixels of extended image 315. For example, referring again to the extended format described with respect to FIG. 2, the nominal values from −0.75 to 0.0 of the extended image format may be used to express wider color gamut and the nominal values 1.0 to 1.25 used to express increased brightness. These nominal values correspond to numeric values of 0 to 393 and 896 to 1023 in the 10 bit expression of the extended image format of FIG. 2. Accordingly, the portions of reference values that are within these ranges are attributable to the specified properties. Portions of the reference values for pixel 315A that are attributable to increased brightness can be extracted to generate reference values of (107, 0, 0) for pixel 322A of increased brightness delta image channel 322. Similarly, portions of the reference values for pixel 315A that are attributable to wider color gamut can be extracted to generate reference values of (383, 179, 230) for pixel 324A of wide gamut delta image channel 324. When these increased brightness and wider gamut reference values are subtracted from the reference values of pixel 320A of delta image 320, the resulting reference values (263, 0, 0) represent the increased precision between the base image format and the extended image format and the differences in the conversion process from a raw image to the extended image format and the base image format and can be encoded as the reference values for pixel 326A of increased precision delta image channel 326. Although the embodiment illustrated in FIG. 4 depicts the separation of delta image 320 into three different images, more or fewer separate image channels may also be used. In another embodiment, multiple delta image channels may be encoded, optionally transmitted, and optionally decoded based on a desire to control bandwidth/quality, and the needs of different decoders (i.e., a device that doesn't support a gamut wider than the nominal range doesn't need the −0.75-1.0 channel transmitted to it. Similarly, a device that supports higher precision may subscribe to a delta image channel that provides that extra range). This approach to generating delta image channels is applicable to most existing file formats/image representations. The described delta image channels may be stored as explicit metadata, stored implicitly by "stuffing" the data into the file/stream where legal (perhaps after the end of the existing image in accordance with the file format's definition), in a separate but related file ("boxcar"), or file system fork.

Figure 5A:
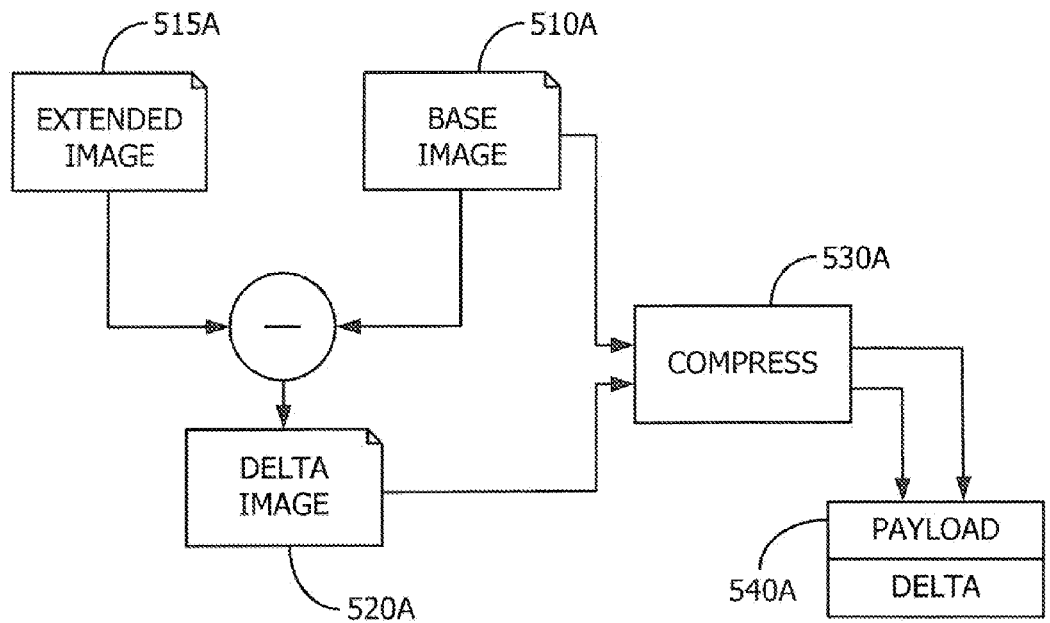
FIGS. 5A through 5C are block diagrams that illustrate processes to encode a base image and extracted image data from an extended image into a widely supported image format in accordance with multiple embodiments.

Referring to FIG. 5A, in order to ensure that the extended image format is compatible with existing devices, the base image may be compressed and encoded using a widely supported image file format (e.g., JPEG and TIFF). In addition, the delta image (which may be separated into one or more delta image channels as described above) may be compressed and packaged as metadata that accompanies the base image according to the standards of the selected file format. In this way, devices that support the extended image format can generate the extended image from the base image and the delta image while devices that do not support the extended image format can simply disregard the delta image metadata and decode the base image in the usual manner.

In the embodiment illustrated in FIG. 5A, base image 510A may be subtracted from extended image 515A to generate delta image 520A. Again, because the extended image format is consistent with the base image format over the range of reference values for the base image format, the subtraction may be performed as a computationally inexpensive pixel by pixel difference operation as described above. Base image 510A may be compressed (530A) and encoded as the payload portion of image file 540A in accordance with the standards of a widely supported image file format (e.g., the JPEG File Interchange Format (JFIF)). Delta image (which may actually be split into several different image channels) may similarly be compressed (530A) and encoded in a metadata portion of image file 540A. By way of example, the JFIF format includes multiple metadata channels. In one embodiment, one or more delta image channels may be compressed and stored in one or more of these metadata channels. Although the JFIF format has been described, additional widely supported image file formats may also enable similar operation. Because the compression and encoding processes are dependent upon the selected file type and are known by those of ordinary skill in the art, these processes are not discussed in detail in this disclosure.

It has unexpectedly been found that delta image channel data is likely to be significantly spatially coherent and, further, may be an unchanging DC level over large areas of the base image (where the raw signal is fully representable by the base). As a consequence, while the delta image channel may be efficiently encoded using the same compression as the payload (i.e., base image), there are other techniques that might further help such as a quadtree representation that would only encode the sparse areas where the delta image channel data is actually modulated. It may also be beneficial to break the delta image channels out into discrete channels (i.e., negative values, hyper unity, and extra precision) to best make use of the individual sparse channels. By way of example only, it may be that specular highlights require significant hyper unity values, and deeply saturated areas negative values. With respect to encoding delta image channel information, while either lossy or lossless encoding techniques can be used, it may be advisable to use lossless compression. Where lossy compression is used, delta image channel data may be determined (computed) to include the effect of the lossy compression. This may be achieved, for example by compressing, and decompressing the base image data before performing the above-described subtraction, effectively encoding the compression error in a delta channel and thereby allowing a higher quality image to be decoded than the base. It has been determined that this is an additional use for the delta channel (over gamma, range, and precision).

Figure 5B:
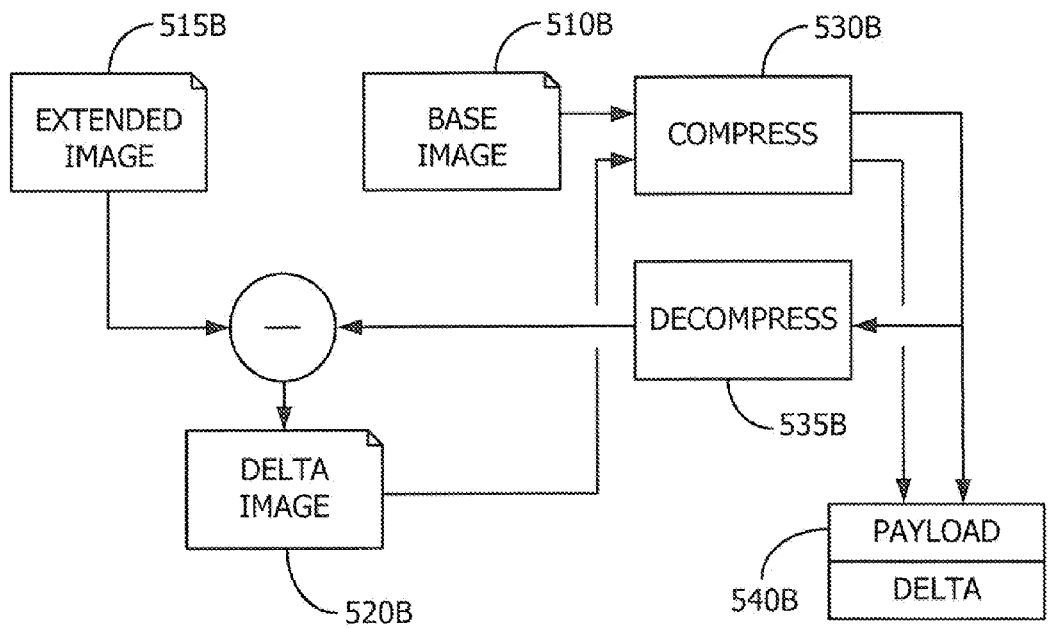

Referring to FIG. 5B, base image 510B may first be compressed (530B) and then decompressed (535B) before the image resulting from the compression/decompression is subtracted from extended image 515B. In the case of a lossy compression algorithm, the compression/decompression operation ensures that the delta image is calculated from the version of the base image that will be used to reconstruct extended image 515B using image file 540B. This reduces error that may occur during the extended image reconstruction process when using a different version of the base image than that which was used to generate the delta image. The compressed base image may be encoded as the payload portion of image file 540B in accordance with the standards of a widely supported image file format. Similarly, delta image 520B may be compressed and encoded in a metadata portion of image file 540B.

In some embodiments, it may be necessary to convert the base image and delta image to a different color model based on the selected file format. For example, if the selected file format for packaging the base image and the delta image is JFIF and the base image is encoded using an RGB color model (with the extended image being expressed as an extension of the same RGB color model), the base image and the delta image may need to be converted to the $Y'C_bC_r$ color model supported by JFIF. Until this point, this conversion process has been assumed to be part of the compression and encoding of the base image and the delta image. However, in certain embodiments, it may be advantageous to convert the color model of the extended image and the base image and to perform the difference operation (between the extended image and the base image) in the converted color space. If the payload portion of the selected file format is capable of encoding a wider range of colors than the color space of the base image (as is the case with the $Y'C_bC_r$ color space of the JPEG standard as compared to the sRGB color space), it may be desirable to include at least a portion of the delta image in the payload portion of the image file rather than the metadata portion. Values outside of the 0.0-1.0 RGB unit cube may be represented in the $Y'C_bC_r$ 0-1 unit volume. Common $Y'C_bC_r$ to R'G'B' converters typically clamp R'G'B' values to 0.0-1.0 so it may be "safe" to encode extended range R'G'B' values in $Y'C_bC_r$ to maintain backward compatibility.

Figure 5C:
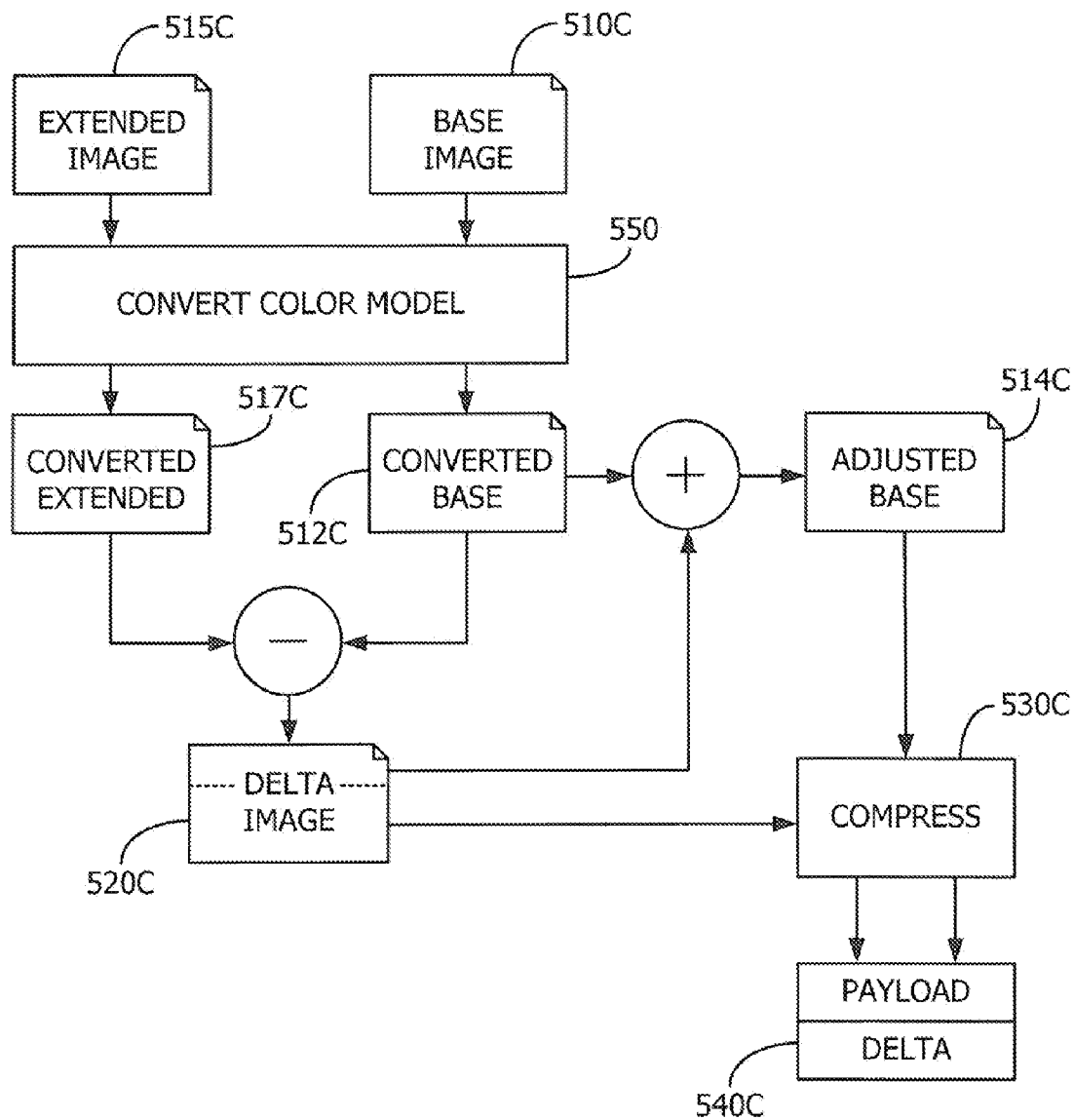

Referring to FIG. 5C, base image 510C and extended image 515C may be converted from a first color model to a second color model (550). In one embodiment, the second color model may be a required color model for encoding an image using a selected file format (i.e., the file format of image file 540C). By way of example, if base image 510C and extended image 515C are encoded using the base image format and the extended image format described above with respect to FIG. 2 and the selected file format requires images to be encoded using the $Y'C_bC_r$ color model, base image 510C and extended image 515C are converted from the RGB color model to the JPEG $Y'C_bC_r$ color model. In one embodiment, the following equations are used to convert the nominal RGB reference values:

$$Y'=0.299(R)+0.587(G)+0.114(B) \quad\quad \text{EQ. (1)}$$

$$C_b=-0.169(R)-0.331(G)+0.5(B)+0.5 \quad\quad \text{EQ. (2)}$$

$$C_r=0.5(R)-0.419(G)-0.081(B)+0.5 \quad\quad \text{EQ. (3)}$$

The example RGB reference values for pixel 315A of extended image 315 (1.21, −0.4, −0.3) and pixel 310A of base image 310 (0.98, 0, 0) described above with respect to FIG. 4 result in converted values of (0.093, 0.278, 1.297) and (0.293, 0.334, 0.99), respectively. After the color model conversion, converted base image 512C is subtracted from converted extended image 517C to generate delta image 520C. Delta image 520C is expressed in the converted color space. A portion of delta image 520C may be extracted and added back into converted base image 512C to generate adjusted base image 514C. For example, the reference values of converted base image 512C may be adjusted towards the reference values of converted extended image 517C by adding a portion of delta image 520C to the extent that the resulting reference values of adjusted base image 514C are within an acceptable range. Referring again to the above example reference values for corresponding pixels of converted base image 512C and converted extended image 517C, the reference values for a corresponding pixel of delta image 520C may be (−0.2, −0.056, 0.307). Some or all of these reference values may be added back to the corresponding values of converted base image 514C to the extent that the resulting values are within an acceptable range of nominal reference values (e.g., 0 to 1). In one embodiment, this may result in reference values for a corresponding pixel of adjusted base image 514C of (0.093, 0.278, 1) and remaining values for the corresponding pixel of delta image 520C of (0, 0, 0.297). Adjusted base image 514C and the remaining portions of delta image 520C (i.e., the portions that were not extracted) may then be compressed (530C) and encoded into a payload portion and a metadata portion, respectively, of image file 540C in accordance with the standards of the image file format of file 540C.

Figure 6:
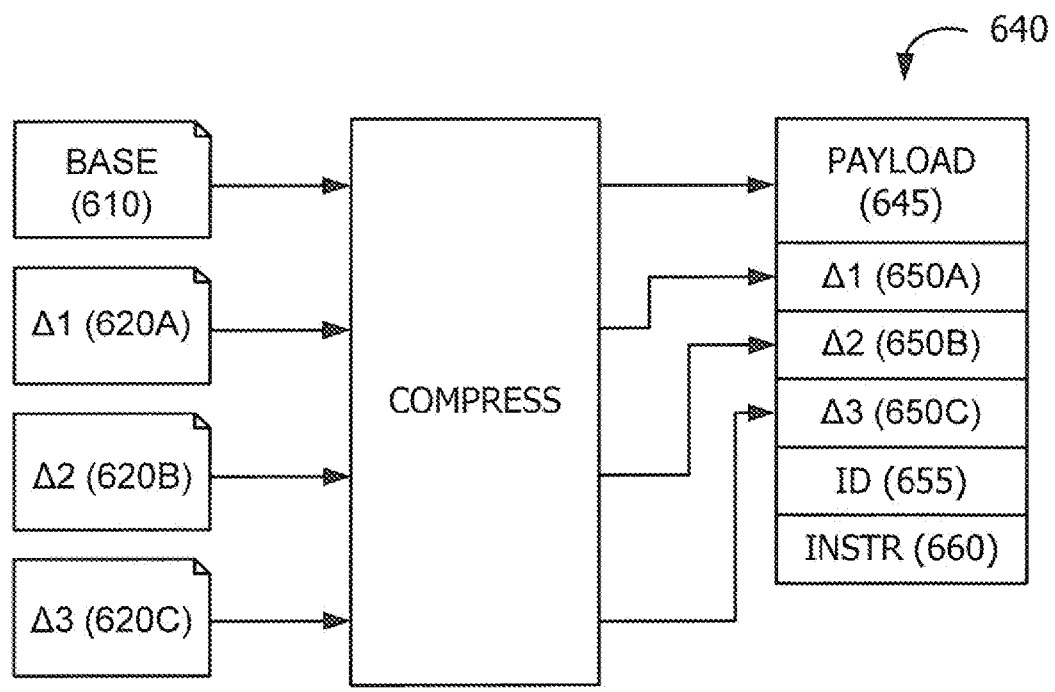
FIG. 6 is a block diagram that illustrates the encoding of a base image, one or more channels of extracted additional image data, and instructions for reconstructing an extended image in a widely supported image format in accordance with one embodiment.

Referring to FIG. 6, in one embodiment, the base image and the delta image may be compressed and encoded in parallel, perhaps using multiple encoding/decoding units. Note, the "additional" encoding units don't have to be identical. That is, there may be an opportunity to use a different hardware encoder for the delta channel information (than the base) and thereby permit hardware acceleration for a different codec making the resulting device more versatile. Alternately the delta channel information could be encoded/decoded in parallel to the base image in a central processing unit (CPU) based codec with the base hardware accelerated. In another implementation, the encoding of both the delta and base images may be CPU-based (e.g., using different cores of a multicore processing unit). In the illustrated embodiment, the delta image has been separated into multiple delta image channels 620A-C as described above. Rather than compressing and saving base image 610 and each of the delta image channels 620A-C, which would require a compress operation, a write operation, and a read operation to encode each of the images into image file 640, base image 610 and delta image channels 620A-C may be compressed in parallel and encoded in image file 640. Base image 610 may be encoded in payload portion 645 of image file 640 and each of delta image channels 620A-C may be encoded in a separate metadata channel 650A-C of image file 640. Although three delta image channels are illustrated in FIG. 6, more or fewer delta image channels may be used.

In one embodiment, a delta image channel may encode the difference between a first compressed version of base image 610 and a second compressed version of delta image 610. For example, base image 610 may be compressed in accordance with the standards of the image file format (i.e., the format of image file 640) and may also be compressed in accordance with an improved compression algorithm. In such an embodiment, the difference between the two compressed versions may be compressed and encoded as one of the delta image channels 620A-C.

In one embodiment, the separation of delta image channels 620A-C into separate metadata channels of image file 640 may enable the selective transmission or usage of the delta image channels. In one embodiment, if it is determined that a recipient device is incapable of utilizing one or more of the delta image channels, only those channels that are useful may be transmitted. For example, if a recipient device is capable of using the precision delta image channel to increase the precision of the displayed image represented by image file 640 but is incapable of utilizing the increased dynamic range, wide gamut, or compression difference channels, the delta image channels that correspond to the increased dynamic range, wide gamut, and compression difference may be extracted before image file 640 is transmitted. Likewise, if a transmission medium has limited bandwidth, some or all of the delta image channels may be extracted prior to transmission of image file 640. Recognition of downstream decoder capabilities can permit the transmitting station to manage bit-rate and deal with network congestion. Similarly, the receiving decoder may selectively decode deltas based on known circumstances (e.g., it may choose to not decode negative delta values when a wide gamut display is not available).

In the illustrated embodiment, image file 640 includes identifier 655 and instructions 660 that are each stored in separate metadata channels of image file 640. Identifier 655 may link originally encoded base image 610 to the delta image channels. This linkage may be used to avoid the application of delta image data to an altered version of base image 610, which could be catastrophic. For example, if image file 640 is modified (e.g., the representation of base image 610 is rotated 90 degrees), the delta image data should not subsequently be used to attempt to regenerate the extended image. In one embodiment, identifier 655 may be a hash of all or some portion of original payload portion 645. In another embodiment, identifier 655 may be a unique identifier that is stored within original payload portion 645 (rather than in a separate metadata channel) and may include a format specific marker such as an extra JPEG restart marker that indicates that the data in payload portion 645 is the original data. Regardless of the specific implementation of identifier 655, any alteration to payload portion 645 would create a mismatch that could be utilized by instructions 660 to abort any subsequent attempt to regenerate the extended image using the payload portion 645 and metadata channels 650A-C. Instructions 660 may also include code that is utilized to reconstruct all or some portion of the extended image using some or all of metadata channels 650A-C.

Figure 7:
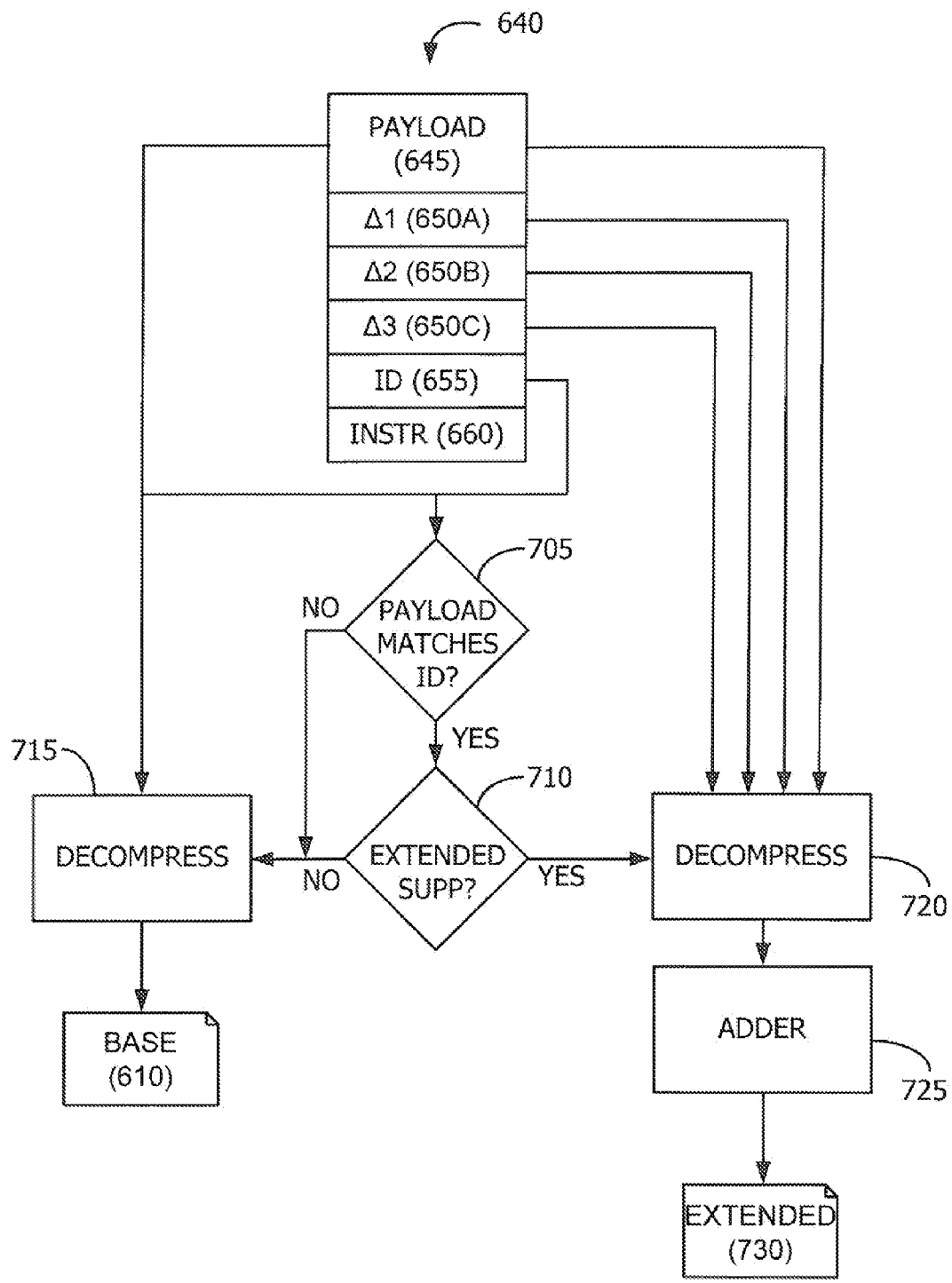
FIG. 7 is a flow chart that illustrates a process for decoding an extended image that is encoded using a widely supported image format in accordance with one embodiment.

Referring to FIG. 7, instructions 660 of image file 640 may determine which version of the image represented by image file 640 is generated. It may first be determined if the data in payload portion 645 matches identifier 655 (block 705). In one embodiment, it may be determined if a hash of payload 645 matches a hash of the originally encoded data in payload portion 645 that is stored in identifier portion 655. In another embodiment, it may be determined if payload portion 645 includes a unique identifier that was included with the originally encoded payload portion 645. If payload portion 645 is consistent with the identifier (the "Yes" prong of block 705), it may then be determined if a device that will be used to display the image supports the extended image format (block 710). If payload portion 645 does not match the identifier (the "No" prong of block 705) or if the extended image format is unsupported (the "No" prong of block 710), payload portion 645 may be decompressed (block 715) to generate base image 610. If, however, the extended image version is supported (the "Yes" prong of block 710), payload portion 645 and metadata channels 650A-C may be decompressed (block 720) and the resulting delta image channels may be added to the resulting base image to generate extended image 730. In one embodiment, less than all of metadata channels 650A-C may be decompressed and added to the base image. In one embodiment, instructions 660 may include code to define necessary conversions and sequences for generating extended image 730 from the base image and some or all of the delta image channels. By defining an extended image format that is consistent with a base image format over the range of reference values of the base image format and by separating an extended image into a base image and difference information between the extended image and the base image, the extended image can be packaged into a widely supported image format that is backwards compatible with existing devices.

Figure 8:
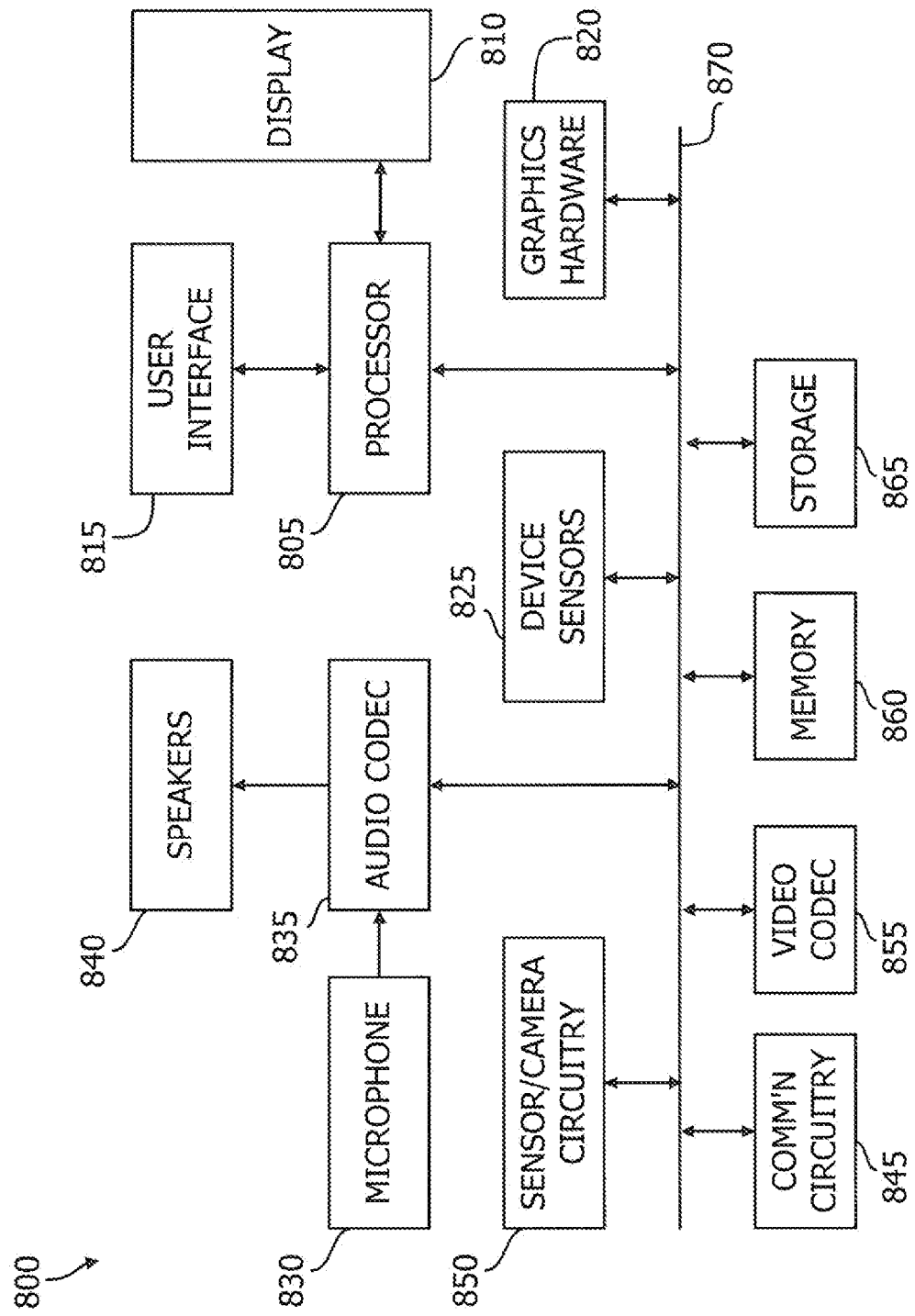
FIG. 8 shows an illustrative electronic device in accordance with one embodiment.

Referring to FIG. 8, a simplified functional block diagram of illustrative electronic device 800 is shown according to one embodiment. Electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture unit 850, video codec(s) 855, memory 860, storage 865, and communications bus 870. Electronic device 800 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 800.

Processor 805 may execute instructions necessary to carry out or control the operation of many functions performed by device 800. Processor 805 may, for instance, drive display 810 and receive user input from user interface 815. User interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable graphics processing unit (GPU).

Sensor and camera circuitry 850 may capture still and video images that may be processed, at least in part, in accordance with the disclosed techniques by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the operations described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processing unit and comprising instructions stored thereon to cause one or more processors to:
   obtain a first image expressed in a first image format, each element in the first image defined by one or more reference values in a first range of values;
   obtain a second image that corresponds to the first image and is expressed in a second image format, each element in the second image defined by one or more reference values in a second range of values, wherein the first range of values is a proper subset of the second range of values;
   obtain a delta image based, at least in part, on the first and second images;
   encode the first image in a payload portion of an image file; and
   encode the delta image in a metadata portion of the image file.

2. The non-transitory program storage device of claim 1, wherein elements in the second image format represent one or more of a wider color gamut, a wider dynamic range, and higher precision than elements in the first image format.

3. The non-transitory program storage device of claim 1, wherein the instructions to cause the one or more processors to obtain a delta image comprise instructions to cause the one or more processors to subtract the first image from the second image.

4. The non-transitory program storage device of claim 1, wherein elements in the second image format have a higher precision than the first image format.

5. The non-transitory program storage device of claim 1, wherein the instructions to cause the one or more processors to encode the delta image in a metadata portion of the image file comprise instructions to cause the one or more processors to separate the delta image into two or more delta image channels, each of the two or more delta image channels representing a property of the second image that is not represented in the first image.

6. The non-transitory program storage device of claim 5, wherein the instructions to cause the one or more processors to encode the delta image in a metadata portion of the image file further comprise instructions to cause the one or more processors to encode each of the two or more delta image channels in separate metadata portions of the image file.

7. The non-transitory program storage device of claim 6, further comprising instructions to cause the one or more processors to selectively extract one or more of the delta image channels from the image file before the image file is transmitted or utilized to generate an image display.

8. The non-transitory program storage device of claim 7, wherein the instructions to cause the one or more processors to selectively extract one or more of the delta image channels from the image file before the image file is transmitted comprise instructions to cause the one or more processors to selectively extract the one or more delta image channels based, at least in part, on one or more properties of a recipient device or a transmission medium to the recipient device.

9. The non-transitory program storage device of claim 5, further comprising instructions to cause the one or more processors to encode instructions to combine the first image and some or all of the two or more delta image channels in the image file.

10. A system, comprising:
an image capture device;
a memory; and
a processor operatively coupled to the image capture device and the memory and configured to execute program code stored in the memory to:
obtain an image with the image capture device,
generate a first version of the image that is expressed in a first image format, each element in the first version of the image defined by one or more reference values in a first range of values,
generate a second version of the image that is expressed in a second image format, each element in the second version of the image defined by one or more reference values in a second range of values, wherein the first range of values is a proper subset of the second range of values,
obtain a delta image based, at least in part, on the first and second images,
encode the first version of the image in a payload portion of an image file, and
encode the delta image in a metadata portion of the image file.

11. The system of claim 10, wherein the program code to cause the processor to encode the delta image in a metadata portion of the image file comprises program code to cause the processor to separate the delta image into two or more delta image channels, each of the two or more delta image channels representing a property of the second version of the image that is not represented in the first version of the image.

12. The system of claim 11, wherein the program code to cause the processor to encode the delta image in a metadata portion of the image file further comprises program code to cause the processor to encode each of the two or more delta image channels in separate metadata portions of the image file.

13. A non-transitory program storage device, readable by a processor and comprising instructions stored thereon to cause one or more processors to:
receive an image file;
decode a payload portion of the image file to generate a first image expressed in a base image format, the first image defined by a first plurality of reference values in a first range of values;
decode a metadata portion of the image file to generate additional image data; and
combine the first image and the additional image data to generate a second image expressed in an extended image format, the second image defined by a second plurality of reference values in a second range of values, wherein the first range of values is a proper subset of the second range of values.

14. The non-transitory program storage device of claim 13, further comprising instructions to cause the one or more processors to determine whether the payload portion of the image file is consistent with an original payload portion of the image file.

15. The non-transitory program storage device of claim 14, wherein the instructions to cause the one or more processors to determine whether the payload portion of the image file is consistent with an original payload portion of the image file comprise instructions to cause the one or more processors to determine whether a hash of all or part of the payload portion matches a hash of all or part of the original payload portion that is stored as part of the image file.

16. The non-transitory program storage device of claim 14, wherein the instructions to cause the one or more processors to determine whether the payload portion of the image file is consistent with an original payload portion of the image file comprise instructions to cause the one or more processors to determine whether a unique identifier is included in the image file.

17. The non-transitory program storage device of claim 16, wherein the unique identifier is a file format specific marker that is encoded in the payload portion of the image file.

18. The non-transitory program storage device of claim 14, further comprising instructions to cause the one or more processors to decode the metadata portion and to combine the first image and the additional image data only when it is determined that the payload portion of the image file is consistent with an original payload portion of the image file.

19. The non-transitory program storage device of claim 18, further comprising instructions to generate a display of the first image when it is determined that the payload portion of the image file is not consistent with an original payload portion of the image file.

20. A device, comprising:
a display element;
a memory; and
a processor operatively coupled to the display element and the memory and configured to execute program code stored in the memory to:
receive an image file,
decode a payload portion of the image file to generate a first image expressed in a base image format, the first image defined by a first plurality of reference values in a first range of values,
decode a metadata portion of the image file to generate additional image data,
combine the first image and the additional image data to generate a second image expressed in an extended image format, the second image defined by a second plurality of reference values in a second range of values, wherein the first range of values is a proper subset of the second range of values, and
display the second image using the display element.

* * * * *